United States Patent
Gossain et al.

(10) Patent No.: US 9,948,551 B2
(45) Date of Patent: Apr. 17, 2018

(54) ROOT NETWORK DEVICE SELECTION

(71) Applicant: SONOS, INC., Santa Barbara, CA (US)

(72) Inventors: Hrishikesh Gossain, Santa Barbara, CA (US); Nicholas A. J. Millington, Santa Barbara, CA (US); Jeffrey M. Peters, Leominster, MA (US)

(73) Assignee: SONOS, INC., Santa Barbara, CA (US)

( * ) Notice: Subject to any disclaimer, the term of this patent is extended or adjusted under 35 U.S.C. 154(b) by 118 days.

(21) Appl. No.: 15/056,888

(22) Filed: Feb. 29, 2016

(65) Prior Publication Data

US 2016/0182366 A1 Jun. 23, 2016

Related U.S. Application Data

(63) Continuation of application No. 13/538,675, filed on Jun. 29, 2012, now Pat. No. 9,306,764.

(51) Int. Cl.
*H04L 12/753* (2013.01)
*H04L 12/28* (2006.01)
(Continued)

(52) U.S. Cl.
CPC .......... *H04L 45/48* (2013.01); *H04L 12/2838* (2013.01); *H04L 12/462* (2013.01); *H04L 45/02* (2013.01)

(58) Field of Classification Search
CPC ... H04L 12/2838; H04L 12/462; H04L 45/02; H04L 45/48
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

CN 101151852 A 3/2008
CN 102176320 A 9/2011
(Continued)

OTHER PUBLICATIONS

"Albro, http://www.itworld.com/article/2764637/personal-technology/sonos-all-in-one-music-player-sounds-great.html, published Nov. 4, 2009 ("Sonos All-in-One Music Player Sounds Great" originally published in PCWorld, 8 pages.".
(Continued)

*Primary Examiner* — Paul H Masur

(57) ABSTRACT

Transmitting, by a current root network device, a first unicast message to a network router and determining, by the current root network device, whether the first unicast message is received by one or more other network devices. If the current root network device determines that the first unicast message is not received by one or more other network devices, then a second unicast message is sent to the network router. If the current root network device determines that the first unicast message is received by one or more other network devices, then the current root network device identifies a particular network device of the one or more other network devices that received the first unicast message to serve as a new root network device. The current root network device sends a message to designate the identified particular network device as the new root network device.

20 Claims, 12 Drawing Sheets

(51) Int. Cl.
*H04L 12/46* (2006.01)
*H04L 12/751* (2013.01)

(56) References Cited

U.S. PATENT DOCUMENTS

| | | | |
|---|---|---|---|
| 6,032,202 | A | 2/2000 | Lea et al. |
| 6,469,633 | B1 | 10/2002 | Wachter |
| 6,778,869 | B2 | 8/2004 | Champion |
| 6,801,506 | B1 | 10/2004 | Dey |
| 6,801,529 | B1 | 10/2004 | McGrane et al. |
| 7,295,548 | B2 | 11/2007 | Blank et al. |
| 7,483,538 | B2 | 1/2009 | McCarty et al. |
| 7,571,014 | B1 | 8/2009 | Lambourne et al. |
| 7,586,856 | B1 | 9/2009 | Thottakkara et al. |
| 7,630,501 | B2 | 12/2009 | Blank et al. |
| 7,643,894 | B2 | 1/2010 | Braithwaite et al. |
| 7,760,668 | B1 | 7/2010 | Zinjuvadia |
| 7,821,963 | B2 | 10/2010 | Guan |
| 7,853,341 | B2 | 12/2010 | McCarty et al. |
| 7,944,858 | B2 | 5/2011 | Tabery et al. |
| 7,949,727 | B2 | 5/2011 | Jensen |
| 7,987,294 | B2 | 7/2011 | Bryce et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 8,538,564 | B2 | 9/2013 | Almstrand et al. |
| 8,572,224 | B2 | 10/2013 | Hite et al. |
| 8,654,649 | B2 | 2/2014 | Vasseur et al. |
| 2002/0124097 | A1 | 9/2002 | Isely et al. |
| 2002/0130834 | A1 | 9/2002 | Madarasz et al. |
| 2004/0047300 | A1 | 3/2004 | Enomoto et al. |
| 2006/0268749 | A1 | 11/2006 | Rahman et al. |
| 2006/0280131 | A1 | 12/2006 | Rahman et al. |
| 2007/0047469 | A1 | 3/2007 | Vasseur et al. |
| 2007/0118618 | A1 | 5/2007 | Kisel et al. |
| 2007/0142944 | A1 | 6/2007 | Goldberg et al. |
| 2007/0206513 | A1 | 9/2007 | Cho et al. |
| 2008/0089246 | A1 | 4/2008 | Ghanwani et al. |
| 2009/0161584 | A1 | 6/2009 | Guan |
| 2009/0310578 | A1 | 12/2009 | Convertino et al. |
| 2010/0020726 | A1 | 1/2010 | Chu et al. |
| 2010/0110880 | A1 | 5/2010 | Kulkarni et al. |
| 2011/0116413 | A1 | 5/2011 | Arai |
| 2012/0051266 | A1* | 3/2012 | Lindstrom ............ H04L 12/413 370/256 |
| 2012/0275346 | A1 | 11/2012 | Wang |
| 2013/0301429 | A1 | 11/2013 | Peters et al. |
| 2014/0098713 | A1 | 4/2014 | Beckhardt et al. |
| 2014/0181202 | A1 | 6/2014 | Gossain |
| 2014/0247754 | A1 | 9/2014 | Venkata et al. |

FOREIGN PATENT DOCUMENTS

| | | |
|---|---|---|
| EP | 1389853 A1 | 2/2004 |
| WO | 2003093950 A2 | 11/2003 |

OTHER PUBLICATIONS

European Supplemental Search Report dated Jan. 27, 2016, issued in connection with European Application No. 13810449.2-1862, 9 pages.
Envisioneering Group White Paper, "The Advent of Multi-Room Digital Music", An Overview of the Sonos Digital Music System, Jan. 2005, 15 pages.
International Bureau, International Preliminary Report on Patentability, dated Jan. 8, 2015, issued in connection with InternationalApplication No. PCT/US2013/048448, dated Jun. 28, 2013, 6 pages.
"International Search Report for Application No. PCT/US2013/048448, dated Oct. 29, 2013, 5 pages.".
International Searching Authority, Written Opinion dated Oct. 29, 2013, issued in connection with International Application No. PCT/US2013/048448, dated Jun. 28, 2013, 4 pages.
Non-Final Office Action dated Apr. 7, 2015, issued in connection with U.S. Appl. No. 13/538,675, filed Jun. 29, 2012, 45 pages.
"Notice of Allowance dated Dec. 3, 2015, issued in connection with U.S. Appl. No. 13/538,675, filed Jun. 29, 2012, 25 pages.".
AudioTron Quick Start Guide, Version 1.0.
AudioTron Reference Manual, Version 3.0.
AudioTron Setup Guide, Version 3.0.
Jo et al., "Synchronized One-to-many Media Streaming with Adaptive Playout Control," Proceedings of SPIE, 2002, pp. 71-82, vol. 4861.
"Denon 2003-2004 Product Catalog," Denon, 2003-2004, 44 pages.
United States Patent and Trademark Office, U.S. Appl. No. 60/490,768 filed Jul. 28, 2003, entitled "Method for synchronizing audio playback between multiple networked devices," 13 pages.
United States Patent and Trademark Office, U.S. Appl. No. 60/825,407 filed Sep. 12, 2003, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Chinese Patent Office, Office Action dated Apr. 5, 2017, issued in connection with Chinese Patent Application No. 2013800452252, 9 pages.
European Patent Office, European Extended Search Report dated Nov. 6, 2017, issued in connection with EP Application No. 17188414.1, 10 pages.
Chinese Patent Office, Second Office Action dated Dec. 4, 2017, issued in connection with Chinese Patent Application No. 201380045225.2, 14 pages.

* cited by examiner

US 9,948,551 B2

ROOT NETWORK DEVICE SELECTION

RELATED CASES

This application claims priority under 35 U.S.C. § 120 to, and is a continuation of, U.S. patent application Ser. No. 13/538,675, filed on Jun. 29, 2012, entitled "Dynamic Spanning Tree Root Selection", the contents of which is hereby incorporated by reference in its entirety for all purposes.

FIELD OF THE DISCLOSURE

The disclosure is related to consumer goods and, more particularly, to systems, products, features, services, and other items directed to networked media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
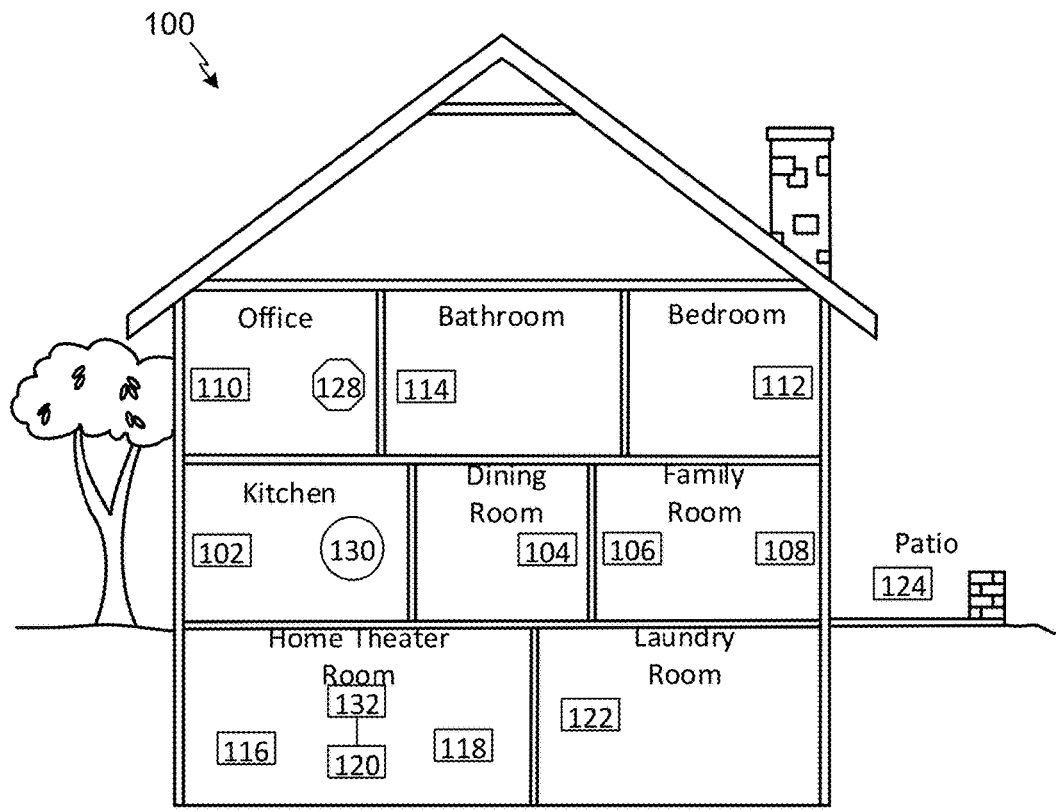
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Listening to audio content out loud can be a social activity that involves family, friends, or both. Audio content may include, for instance, music, talk radio, books, audio from television, and other audible material. For example, in a household, people may play music out loud at parties and other social gatherings. In such environments, people may wish to play the music in one listening zone or multiple listening zones simultaneously, such that the music in each listening zone may be synchronized, without audible echoes or glitches. Such an experience may be further enriched when people, for example, browse audio sources, add a music track to a playback queue, learn more about a music track (such as track title or track artists), or view what music track is next in the playback queue.

Listening to audio content out loud may also be an individual experience. For example, an individual may play music out loud for themselves in the morning before work, in the evening during dinner, and/or at other times throughout the day at home, work, or on the road. For these individual experiences, the individual may choose to either use headphones, or limit the out loud playback of audio content to a single zone or area.

In the present application, systems and methods are provided to offer a unique wired, wireless, or both wired and wireless audio solution that allows audio content to be played in a single listening zone or across multiple listening zones simultaneously and in synchrony. The audio content may be played out loud or using headphones. In an example, such a system may include audio players, often referred to as zone players or players, and controllers, which may also be a player. The controllers may be used to control the system, and may include capabilities for browsing and selecting audio content for playback, viewing and editing audio content in one or more playback queues, or grouping and ungrouping zone players into one or more listening zones, etc. In a sense, the system may operate, as a distributed system such that each controller has full control over the entire system, and each player has the ability to play audio content from either a same audio source or a different audio source as another player.

Example systems, methods, apparatus, and articles of manufacture disclosed herein provide for low-latency delivery and playback of audio. Example systems, methods, apparatus, and articles of manufacture disclosed herein may be advantageously used to provide wireless playback of audio in a home theater environment while reducing or avoiding perceptible lag between presented video and audio. Embodiments disclosed herein may be further useful in systems in which low-latency delivery of audio content over a wireless communication link is required or preferred.

As described in greater detail below, the systems, methods, apparatus, and articles of manufacture disclosed herein can provide a user with a media playback system optimized or improved to reduce latency in delivery between components of the system and provide improved synchrony and responsiveness in control and content playback.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

a. Example Zone Players

Figure 2A:
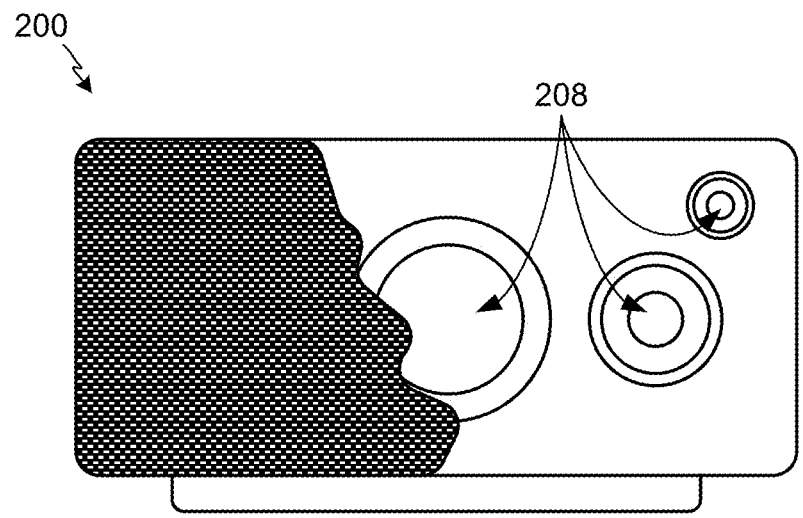
FIG. 2A shows an illustration of an example zone player having a built-in amplifier and speakers.
Figure 2B:
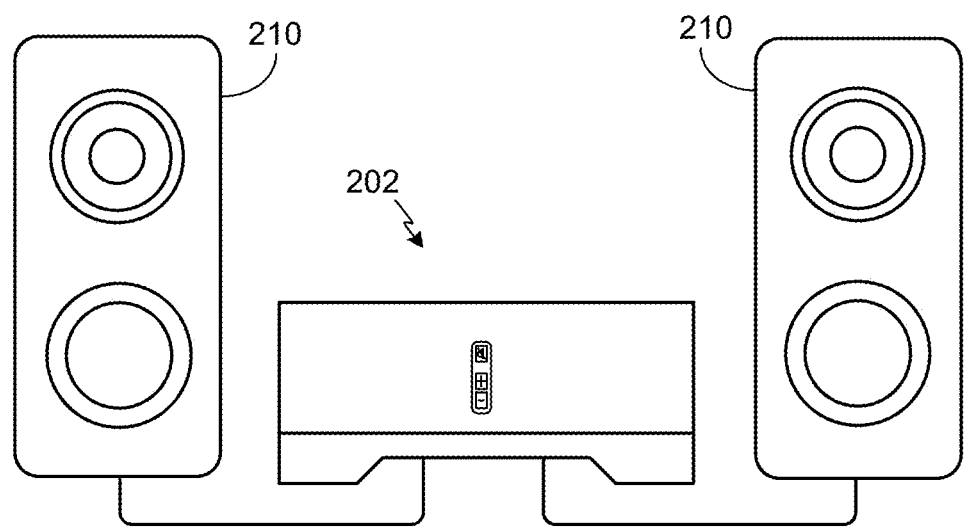
FIG. 2B shows an illustration of an example zone player having a built-in amplifier and connected to external speakers.
Figure 2C:
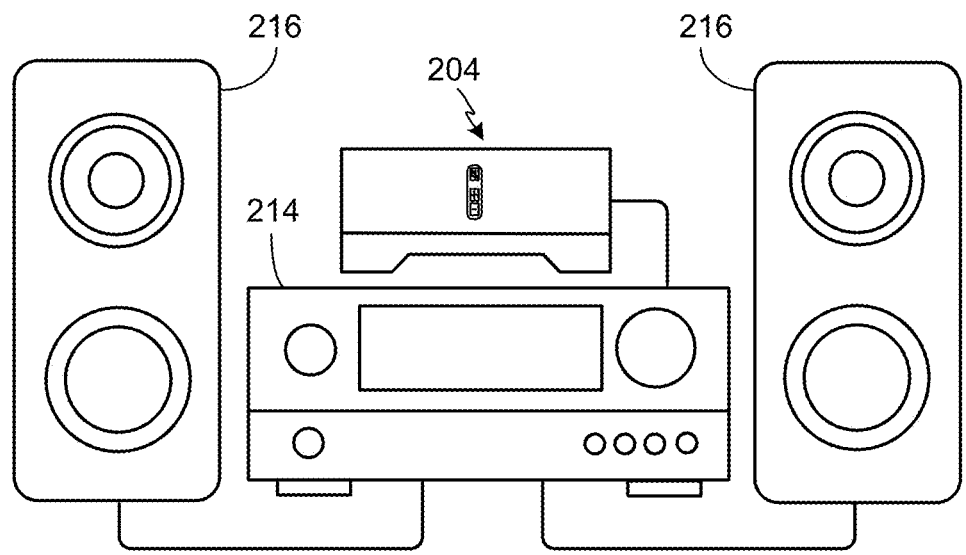
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple iPod™ or similar device.

b. Example Controllers

Figure 3:
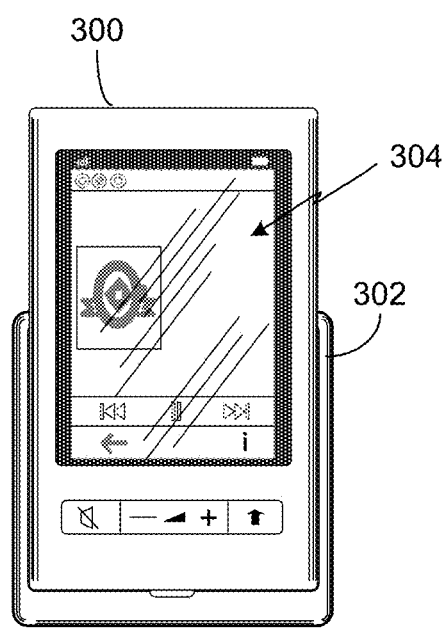
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination might happen, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™ IPAD™ ANDROID™ powered phone, or any other smart phone or network-enabled device can be used as controller 130. An application running on a laptop or desktop personal computer (PC) or MAC™ can also be used as controller 130. Such controllers may connect to system 100 through an interface with data network 128, a zone player, a wireless router, or using some other configured connection path. Example controllers offered by SONOS, Inc. of Santa Barbara, Calif. include a "Controller 200," "SONOS® CONTROL," "SONOS® Controller for IPHONE™," "SONOS® Controller for IPAD™," "SONOS® Controller for ANDROID™, "Sonos® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
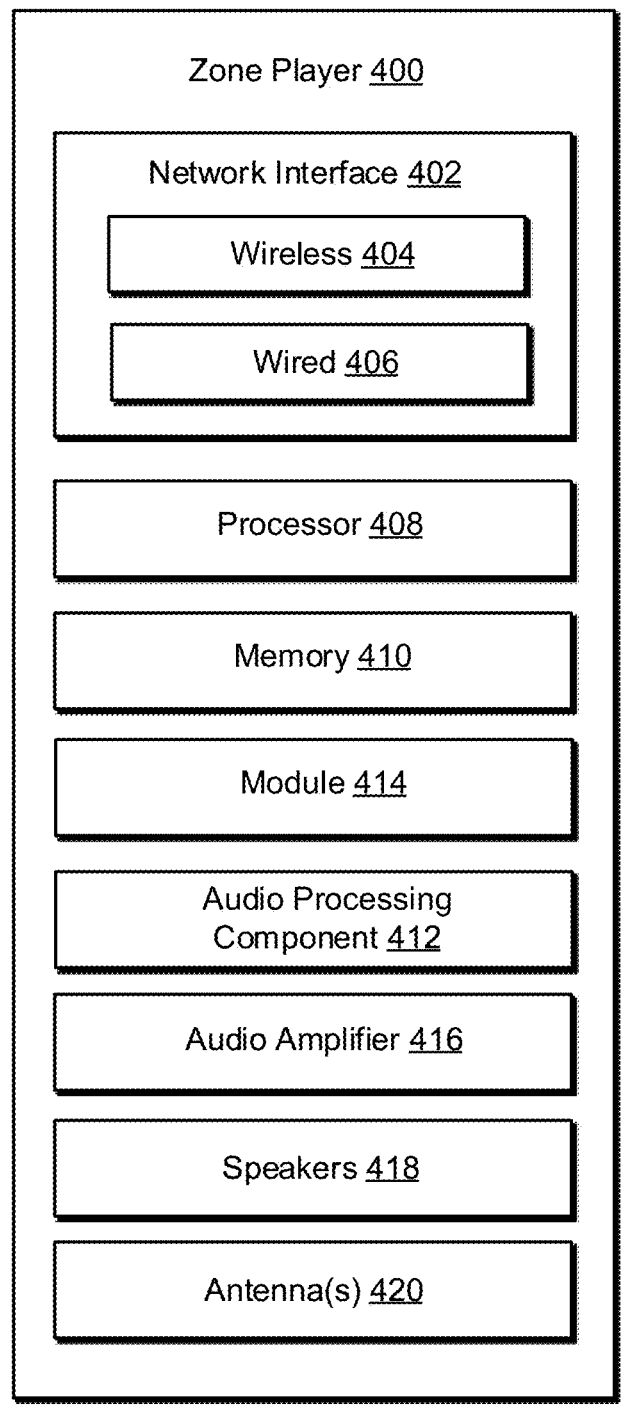
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY: 5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from the PLAY:5.

IV. Controller

Figure 5:
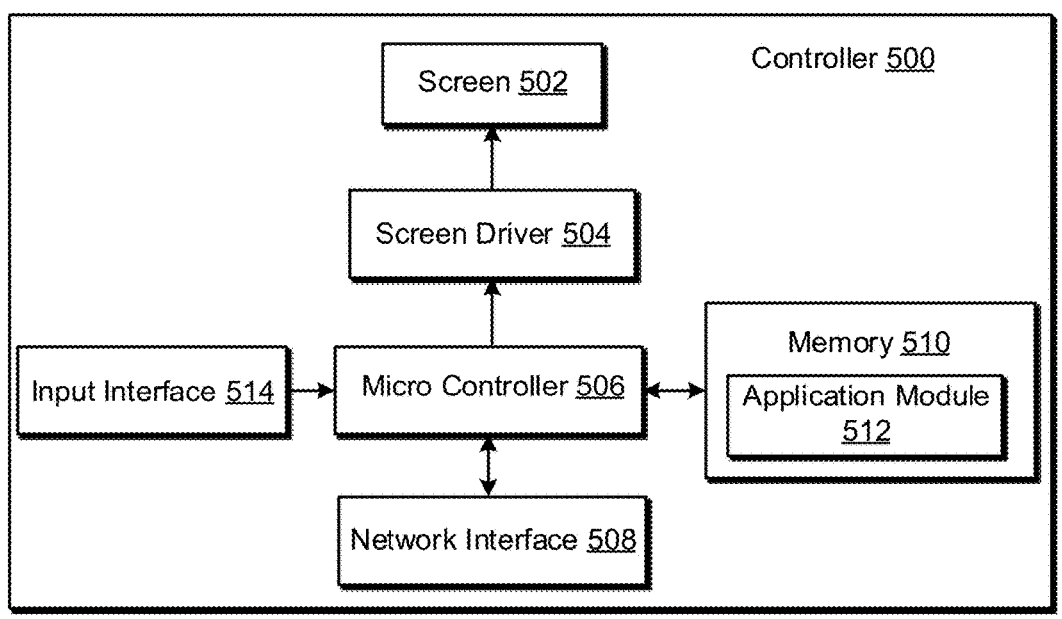
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
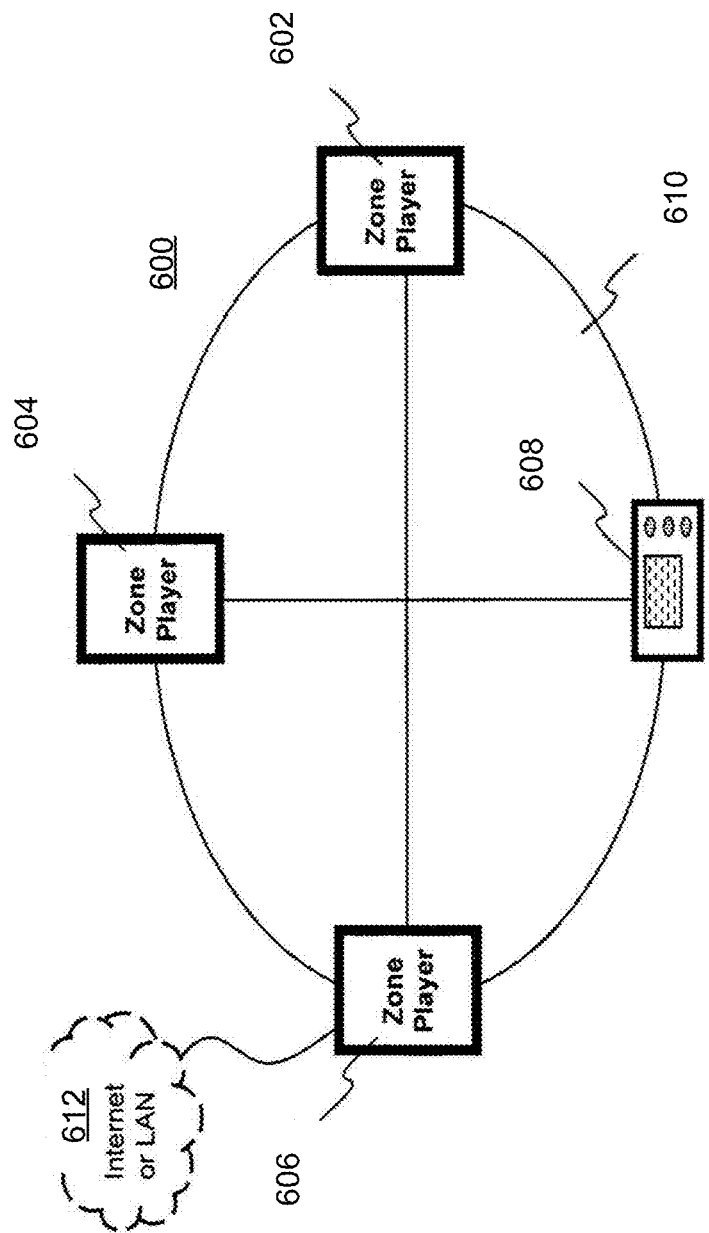
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 608 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example Spanning Tree Protocol

In certain embodiments, devices on a playback network can communicate via a spanning tree protocol. A spanning tree protocol (STP) refers to a network protocol that structures a network to avoid bridge loops by, in general, 1) designating a root node, 2) calculating the least cost path from other nodes to the root node, and 3) disabling other paths. A bridge loop is a condition in which there is more than one communication path (e.g., data link layer path) between endpoints or nodes on the network. The STP is standardized as IEEE 802.1D, for example. In certain embodiments, the STP creates a spanning tree within a mesh network of connected switches and/or other bridge devices and disables links that are not part of the spanning tree, leaving a single active path between any two network nodes.

In a local area network (LAN), such as an Ethernet or token ring network, computers and/or other devices compete to use a shared telecommunications path at any given time. If too many devices try to send data simultaneously, an overall performance of the network can be affected. To reduce a likelihood of such an occurrence, the local playback network can be divided into two or more network segments with a device, referred to as a bridge, connecting any two segments. Each data message passes through the bridge before being sent to the intended destination (e.g., a playback device). The bridge determines whether the message is for a destination within the same segment as the sender's or for another segment, and forwards the message accordingly. A bridge may be a playback device and/or other device on the network, for example.

A spanning tree algorithm allows each bridge to determine how to process and route information. The spanning tree algorithm is constructed to avoid bridge loops, for example, by using a most efficient path when faced with multiple paths. If the best path fails, the algorithm recalculates the network and finds the next best route, for example.

A root bridge of a spanning tree protocol is the bridge with a smallest (e.g., lowest) bridge identifier (ID). Each bridge has a configurable priority number and media access control (MAC) address, and the bridge ID combines these numbers into a single identifier. In an event of a tie between bridges for least-cost paths, a tie-breaker may be configured by the network to determine which bridge becomes the root.

The use of spanning tree protocol enables the delivery of low-latency audio by determining shortest paths between points and by reducing (e.g., avoiding) unnecessary hops of the low-latency audio data between zone players. An example spanning tree protocol configuration may be a spanning tree protocol table (e.g., stored in the memory 410) that includes the ports and/or devices to which a playback device, such as the zone player 400, is connected. In certain embodiments, a playback device, such as a zone player, includes a spanning tree protocol controller to facilitate spanning tree algorithm execution.

Figure 7:
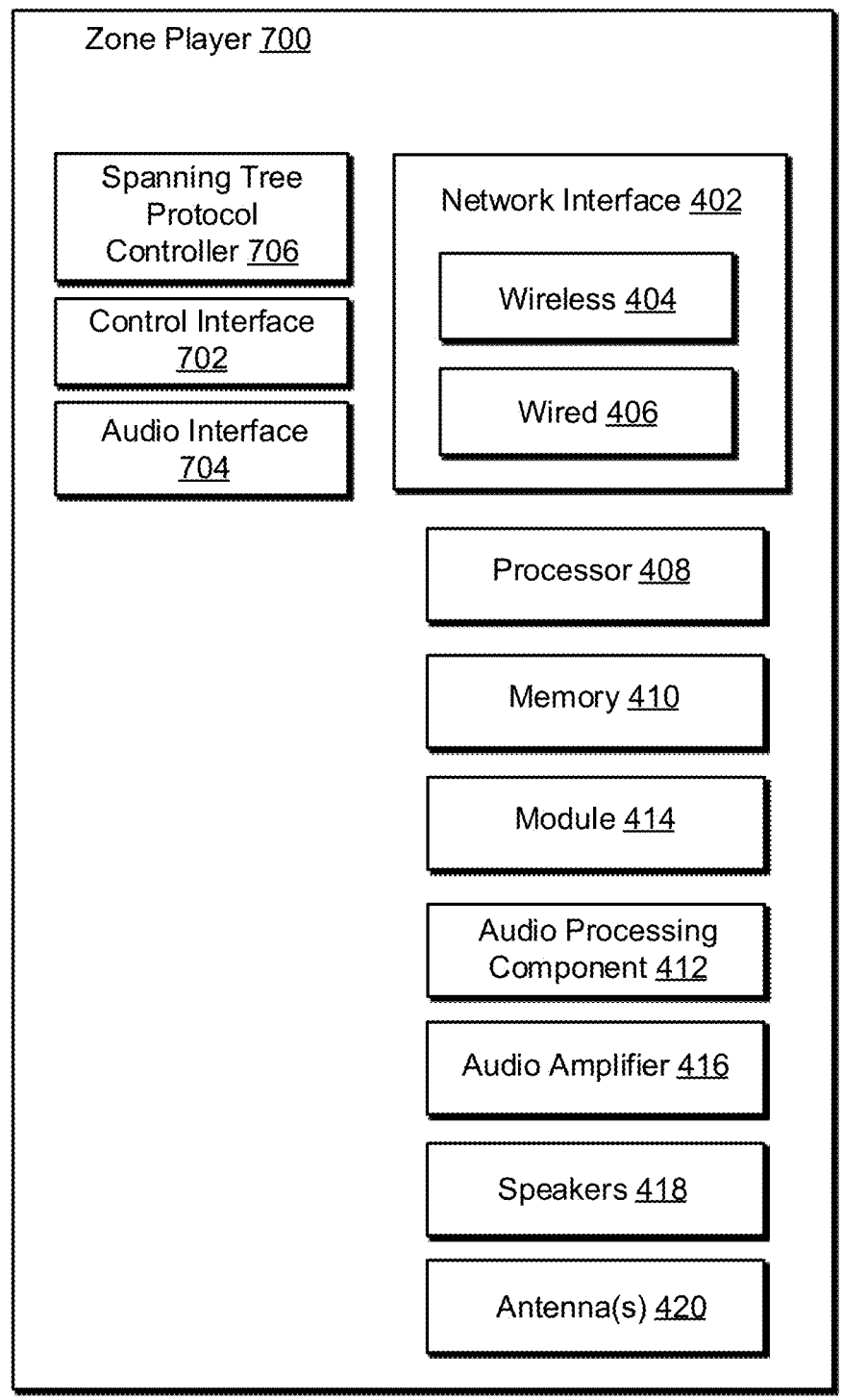
FIG. 7 shows an internal functional block diagram of an example zone player.

FIG. 7 shows an internal functional block diagram of an example zone player 700 including spanning tree protocol control. The example zone player 700 of FIG. 7 may be used to implement any of the example zone players 102-124 of FIG. 1. In some embodiments, the example zone player 700 may be used to implement one of the home theater zone players 116, 118, 120 and may include a sound bar. As used herein, a "sound bar" refers to a single playback device including an array of speakers configured to replicate audio for video and to replicate audio in general. In some instances, a sound bar may simulate or partially simulate a surround sound experience.

Like the example zone player 400 of FIG. 4, the example zone player 700 of FIG. 7 includes a network interface 402 (including wireless 404 and wired 406 interfaces), a processor 408, a memory 410, an audio processing component 412, a module 414, an audio amplifier 416, speakers 418, and one or more antenna(s) 420. These components are discussed in more detail above. More or less components may be included depending on the desired configuration.

The example zone player 700 of FIG. 7 further includes a control interface 702 and an audio interface 704. The control interface 702 transmits and/or receives control information (e.g., configuration information) via the network interfaces 402. For example, the control interface 702 may communicate configuration information to one or more zone players and/or communicate configuration information to one or more other zone players via the wireless 404 and/or wired 406 interface. In some examples, the control interface 702 receives configuration information from other zone players. The example control interface 702 additionally or alternatively communicates control information (e.g., channel probes, keep-alive probes, etc.) to other zone players via the interface 402.

The example audio interface 704 of FIG. 7 transmits audio information and/or receives audio information via the interfaces 404, 406. For example, the audio interface 704 may receive digital audio information from an Internet source, from a local networked source (e.g., a computer via a LAN), and/or from another home theater component such as a television, a cable box, an optical media player (DVD, Blu-ray disc, etc.), a digital media player, a video game console, and/or any other type of audio source. The example audio interface 704 further transmits received audio information to one or more zone players, including standard zone players (e.g., via line-out connection such as RCA or optical output, or via a mesh network via the interface 402, such as a 2.4 GHz interface) and/or other zone players (e.g., via a star network). In some examples, the audio interface 704 transmits the audio information based on control information provided by the control interface 702.

The example primary zone player 700 of FIG. 7 further includes a spanning tree protocol controller 706 to control a spanning tree protocol configuration. The example zone player 700 of FIG. 7 advantageously uses spanning tree protocol to communicate with other zone players and/or other device in a mesh network. Use of spanning tree protocol enables the delivery of low-latency audio by determining shortest paths between points and by reducing (e.g., avoiding) unnecessary hops of the low-latency audio data between zone players, for example. An example spanning tree protocol configuration may be a spanning tree protocol table (e.g., stored in the memory 410) that includes the ports and/or devices to which the example zone player 700 is connected. The example spanning tree protocol controller 706 reconfigures the spanning tree protocol table when additional zone players are added and/or when configurations of zone players change. For example, the spanning tree protocol controller 706 changes the spanning tree protocol table when the zone player 700 disconnects from a satellite zone player (e.g., connected via a mesh networking mode) and reconnects to the same satellite zone player in a different networking mode (e.g., a star networking mode).

Figure 8:
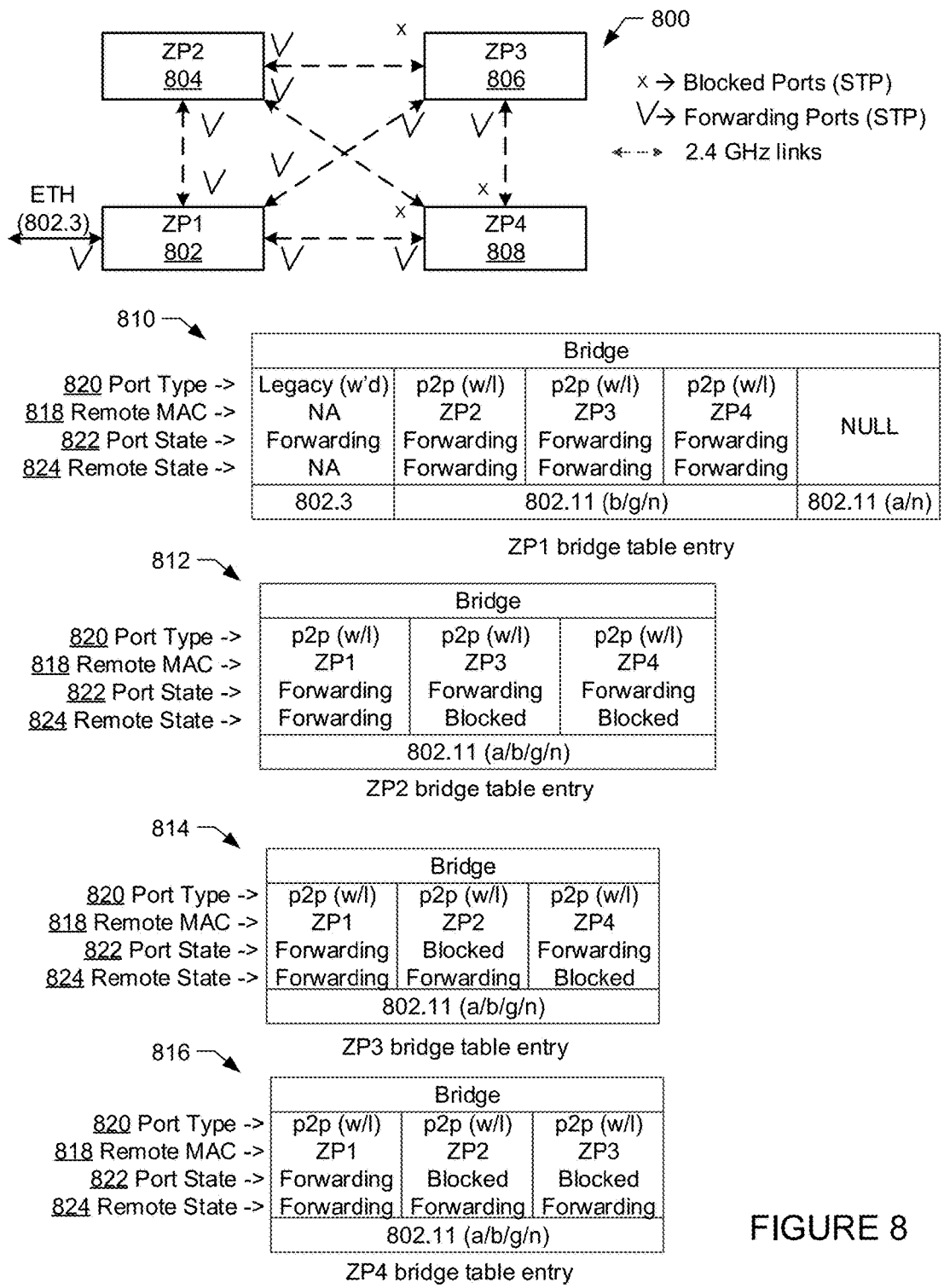
FIG. 8 shows a block diagram of another example zone player network and respective spanning tree protocol tables when the zone player network is in a mesh configuration.

FIG. 8 shows a block diagram of an example zone player network 800 including zone players 802, 804, 806, 808. FIG. 8 further shows respective spanning tree protocol tables 810, 812, 814, 816 for the zone players 802-808 when the zone player network is in a mesh configuration. In the mesh configuration illustrated in FIG. 8, any of the zone players 802-808 may be grouped into a zone group with any one or more of the other zone players 802-808 and/or with any other zone players connected to a common network.

The example spanning tree protocol tables 810-816 illustrate the spanning tree protocol configurations for the respective zone players 802-808. In the example zone player network 800, the zone player 802 (e.g., ZP1) is configured as the root node with respect to the other zone players 804-808. However, in some example zone player networks other zone players besides zone player 802 may be configured as the root node of the network, in which case zone player 802 is configured as a node through which the lowest-cost path from the zone players 804-808. The zone players 804-808 are configured as nodes based on their respective addresses.

The spanning tree protocol table 810 for zone player 802 includes forwarding tables for ports used by the example zone player 802. When another zone player (e.g., the zone player 808) is initially connected to the network 800, the spanning tree protocol controllers 706 of the other zone players 802-806 add respective entries to reflect the new connection to the zone player 808.

The mesh network is generated at runtime when devices see probes from other devices (e.g., via a channel in a wireless spectrum, such as the 2.4 GHz spectrum). When a new device is discovered (e.g., added to the network 800), each existing device on the network (e.g., the zone players 802-806) creates respective peer-to-peer tunnels in its bridge layers. The peer-to-peer tunnels identify the new device 818 (e.g., the Media Access Control or MAC address of the new device), identify the type of port or tunnel 820 (e.g., peer-to-peer, wireless peer-to-peer), identify the forwarding state of the port or tunnel 822 (e.g., what to do with packets received from the new device), and identify the forwarding state of the remote port tunnel 824 (e.g., what the new device is to do with packets received from the device associated with the spanning tree protocol table).

In the example network 800, probes are examined to see if they contain an element that includes the identifying information (e.g., the UUID) of the expected zone player 802. If the probe is not from the zone player 802, the probe is dropped and no peer-to-peer tunnel is created. As a result, a wired Ethernet port may be bridged to a single wireless peer-to-peer tunnel that connects one of the zone players 804-808 to the zone player 802. If the wireless peer-to-peer tunnel is not established because the satellite zone player 804-808 did not receive probe from the zone player 802, the zone player network 800 can still be established with wired ports.

By initiating the zone player network 800 as a single-linked mesh network (or when a zone player configuration changes from a mesh mode to a star or satellite mode), extra topology changes of the network 800 are potentially reduced (e.g., minimized). If the zone player network 800 was initiated as a full mesh, and peer-to-peer links to zone players, other than the zone player 802, are removed after the primary zone player 802 is discovered, one or more links that are in used could be removed, thereby disrupting playback. Additionally, initiating new zone players in a full mesh mode could force an extra topology change every time a zone player boots (e.g., is initiated and/or added to the network 800). In some instances, such topology changes can potentially result in a significant performance degradation to the network while the network 800 is reconfigured.

As illustrated in the spanning tree protocol tables 812-816, some of the example ports are blocked according to the spanning tree protocol. The blocked ports reduce (e.g., prevent) looping of data in the network.

VII. Example Spanning Tree Protocol Root Selection

In certain embodiments, a first zone player added to a household (HH) network is elected as root of a spanning tree. Designation of the first zone player added as the root is facilitated by statically configuring a "bridge priority" of the first zone player to be lower than any other zone player added to the local network (e.g., the household network). In certain embodiments, since the bridge priority is the first parameter compared for root selection (e.g., lower bridge priority wins), this ensures that the first zone player added to the local network is always elected as the root of the spanning tree.

Figure 9:
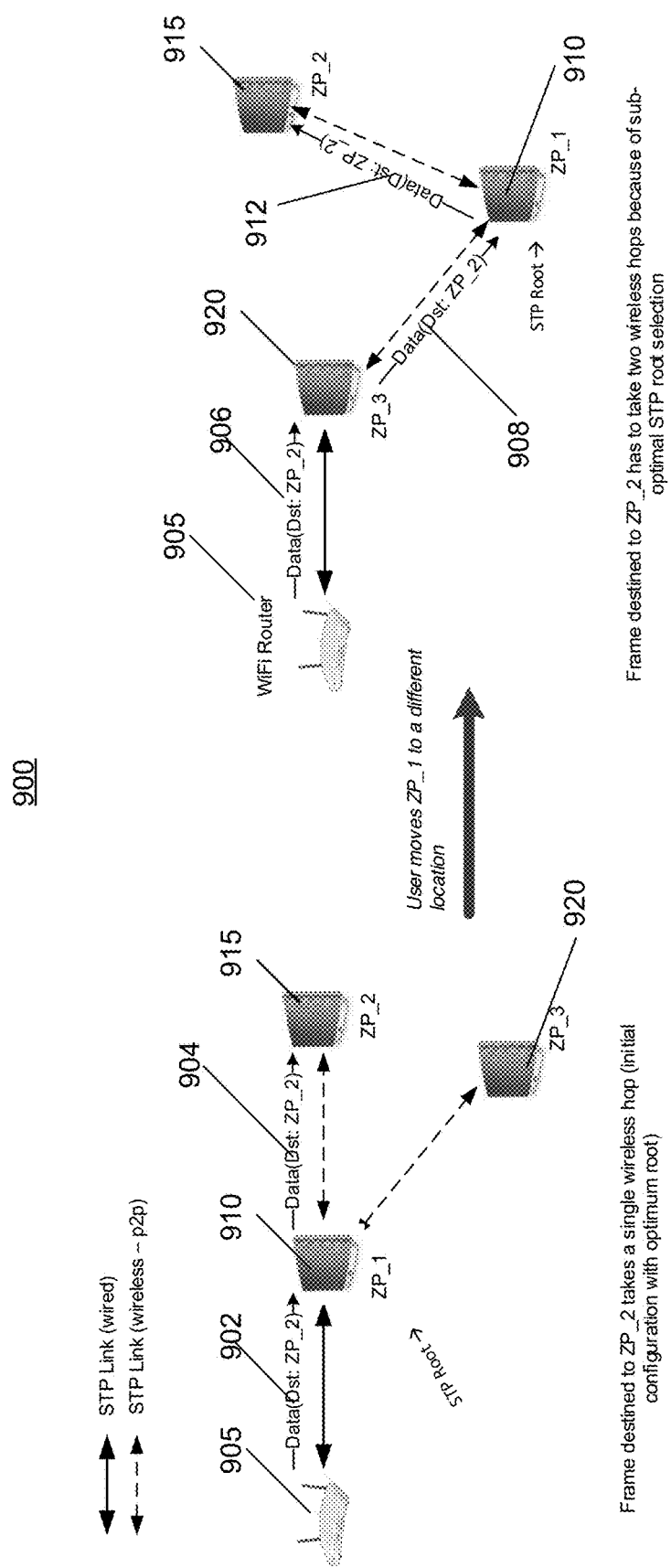
FIG. 9 illustrates an example spanning tree root selection process.

A side effect of such root determination occurs, for example, when the user moves the root to a different location, and the "root" zone player is now multiple hops away from its home router. Because of the static configuration of the bridge priority, this zone player still elects itself as the root of spanning tree, although a more optimum root of the spanning tree might be available. This results in sub-optimal paths for frame forwarding (as illustrated in FIG. 9, for example).

To help avoid sub-optimal root selection, certain embodiments provide methods to reselect a spanning tree root. An example reselection process is initiated by a current root of a spanning tree and is based on an observation that a zone player that is nearest to a default router for the network should be the root of the spanning tree.

In certain embodiments, viewed in terms of a number of hops for a message to reach its intended target, a preferred or "optimum root" of a network's spanning tree is nearest to a default router (e.g., a household default router). For example, if a unicast frame is sent from a current root to its default router, the only time any other zone player will receive this frame is when current root is not the optimum root of the spanning tree.

In certain embodiments, if more than one bridge is directly wired to the default router, any of the bridges can be elected as the root of the spanning tree.

For the reselection process, it is assumed that each zone player in a local network (e.g., in a household) has a forwarding entry for its default router MAC address. This helps ensure that if a zone player receives a unicast frame destined for its default router's MAC address, the zone player does not flood the unicast frame to all of the zone player's forwarding ports, for example.

In certain embodiments, the following zone player(s) are to participate in root reselection: a root zone player with a valid forwarding entry for default router; and intermediate zone player(s) (e.g., on a path from the root zone player to the default router) with a valid forwarding entry for default router and at least one legacy port in a forwarding state. Root reselection is triggered by the zone player that is currently serving as the root of the spanning tree. If none of the zone players are serving as root, it is assumed that a user has manually configured another device as the root of the topology, and, in this case, root reselection is not executed.

In certain embodiments, root reselection is facilitated using a query-based process involving a determination of root path cost. Using a root path cost analysis, a current root of the spanning tree sends a special unicast Root Path Cost Query frame (e.g., rtPathCostQry) to its default router. Another zone player will not receive this frame unless the existing root is not the optimal root, and the zone player is relaying the message from the current root to the router. Assuming that each zone player in a household is registered to receive the special unicast frame, each zone player returns a response to the current root including that zone player's "root path cost".

A "root path cost" to the root bridge of the spanning tree is a path from a connected zone player to the root that has a preferred or optimum cost among all paths from the zone player to the root. The cost of traversing a path is based on the costs of the segments on the path. Different technologies have different default costs for network segments. In certain embodiments, the optimum root of the spanning tree is the zone player with largest value of "root path cost", for example.

FIG. 9 illustrates an example of a sub-optimal spanning tree root selection process in a network 900. As illustrated in the example of FIG. 9, the example household network 900 includes a router 905, a first zone player 910, a second zone player 915, and a third zone player 920. The first zone player 910, currently designated as root for the network, communicates 902 with the router 905 and transmits a message frame 904 to the second zone player 915. The message frame 904 takes a single wireless hop to reach the second zone player 915.

As shown in the example of FIG. 9, if a user moves the first zone player 910 to a different location, the first zone player 910 sends a frame to the second zone player 915 along a different path. That is, the frame from the router 905 takes two hops 906, 908, 912 to pass from the router 905 to the third zone player 920 to the first zone player 910 to the second zone player 915. Based on this increased path cost, the first zone player 910 is no longer an optimal root selection. For example, in this example, the third zone player 920 makes a more optimal root selection to communicate between the router 905 and the other zone players 910, 915.

Figure 10:
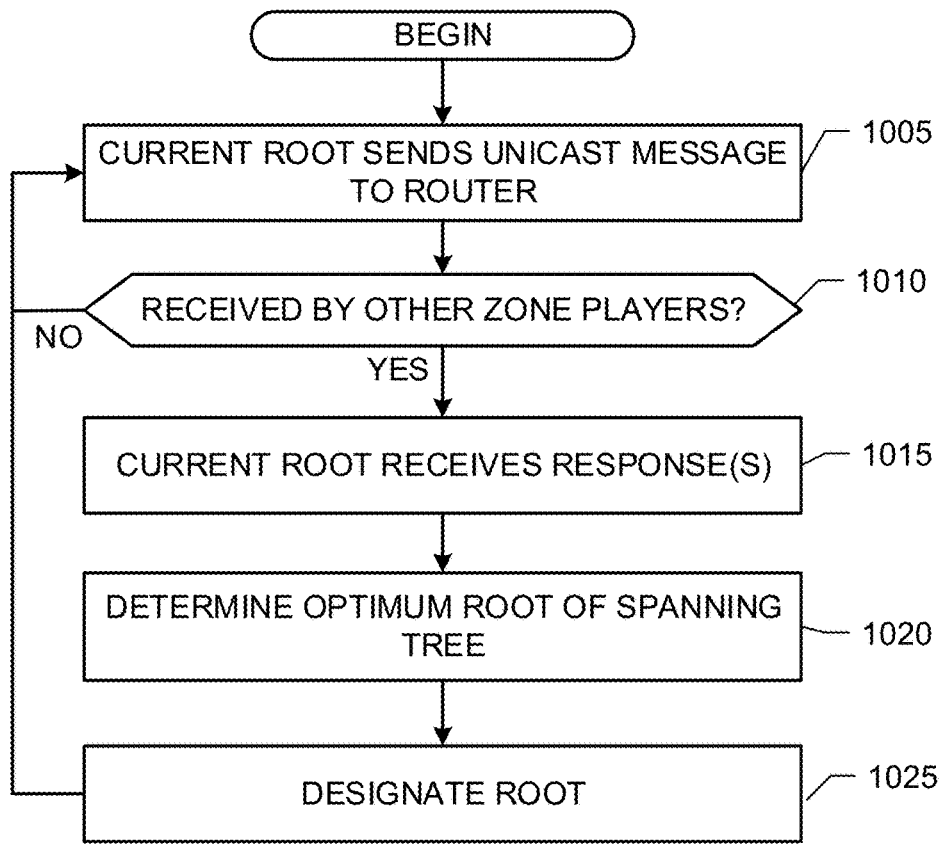
FIG. 10 illustrates a flow diagram of an example method to provide spanning tree root selection.

FIG. 10 illustrates a flow diagram of an example method 1000 to provide spanning tree root selection. At block 1005, a current root on a network (e.g., a household mesh or star network) sends a unicast message to a network router. At block 1010, it is determined whether the unicast message is received by other zone player(s) on the network. If not, then the current root can again send a unicast message (e.g., periodically or later in time). If the unicast message has been received by other zone player(s) rather than or before the router, then at block 1015, the current root receives the response(s) from the other zone player(s). At block 1020, based on received responses, the current root determines an optimum root of the network spanning tree. At block 1025, a root is designated. For example, the current root may determine that another zone player is a more optimal root for the current network spanning tree configuration and may then send a message to designate that other zone player as the new root.

Figure 11:
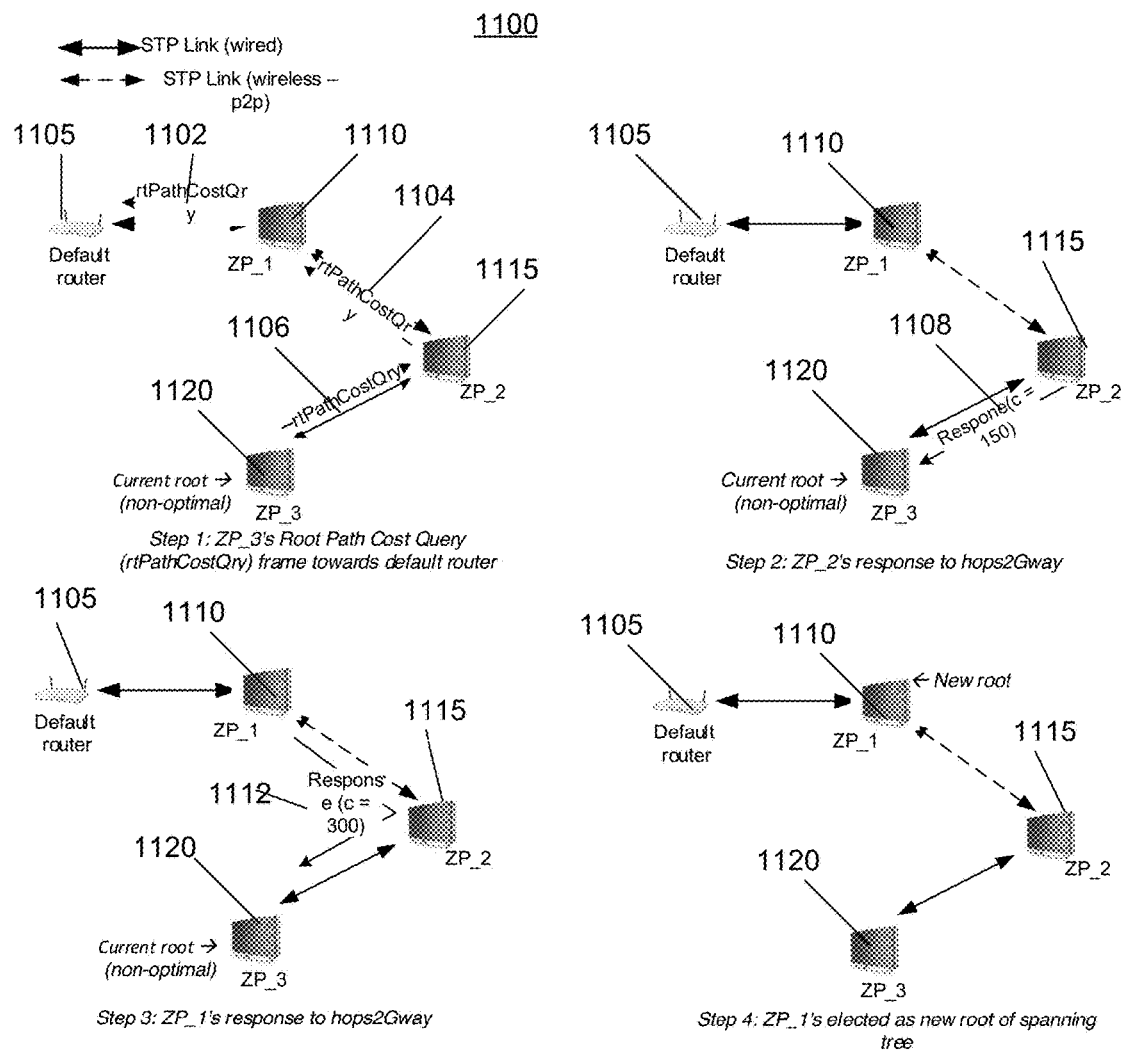
FIG. 11 illustrates an example network including a plurality of connected devices in a spanning tree configuration in which a root is re-selected.

FIG. 11 illustrates an example network 1100 including a plurality of connected devices in a spanning tree configuration in which a root is re-selected. A default router 1105 communicates with a plurality of zone players 1110, 1115, 1120 via communication links 1102, 1104, 1106. Initially, zone player 1120 is designated as the current root for the network. The zone player 1120's root path cost query transmits unicast message frame toward the default router 1105.

When the zone player 1115 receives the message from the zone player 1120, the zone player 1115 sends a response 1108, which has an associated cost (e.g., a cost of 150). The zone player 1110 also receives the message, via the zone player 1115, and returns a response 1112, which is greater than the response 1108 (e.g., a cost of 300) because the zone player 1110 is closer to the router 1105 and farther from the current root 1120.

The zone player 1120 receives the responses 1108, 1112 and analyzes their cost (e.g., 300 versus 150). Based on a root path cost analysis, the zone player 1120 determines that it is no longer the optimal root, and the zone player 1110 has a high cost and should be designated as the new root for the network 1100.

Figure 12:
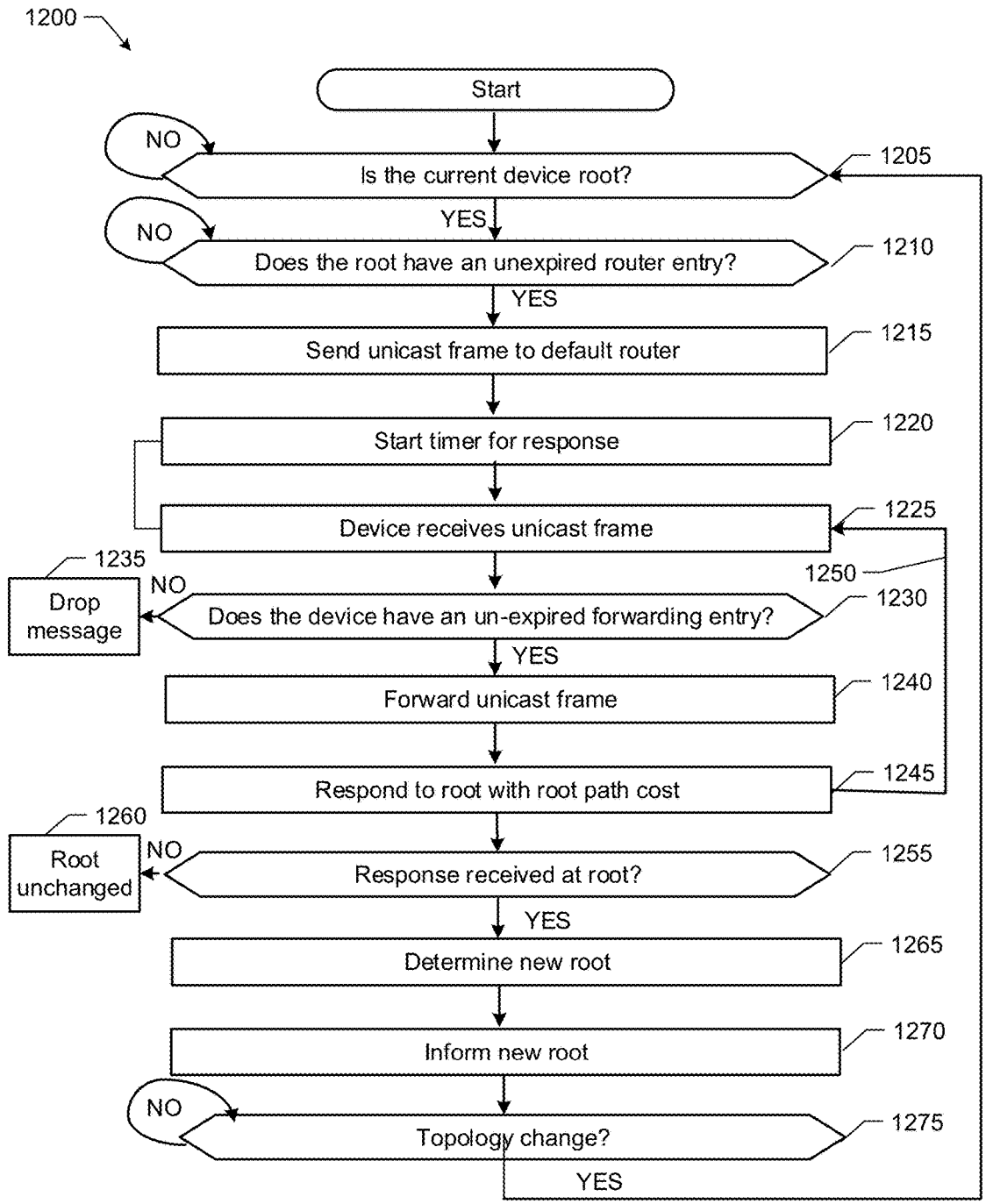
FIG. 12 shows a flow diagram of an example method to provide spanning tree root selection.

FIG. 12 shows a flow diagram of an example method 1200 to provide spanning tree root re-selection. At block 1205, a device determines whether it is the current root. For example, a playback device on a local playback network obtains its IP address and detects it is the root of spanning tree in the local network. The device may determine if it is the root, for example, by examining its spanning tree root path cost. If the device's root path cost is "0", then the device is the root of the spanning tree. At block 1210, the root determines whether it has an un-expired entry for the default router's MAC address in its bridge table. If so, at block 1215, the root sends a unicast message (e.g., a path cost query frame) towards its default router. In certain examples, the unicast frame has a special ethertype to identify it as a root path cost query frame. Each playback device registers to receive this frame. This frame will be discarded by default router, for example.

At block 1220, the root also starts a timer for a period within which the root expects response(s) back from intermediate device(s). For example, the timer can be set to a variable such as PATH_COST_QRY_TIMEOUT (→3 seconds). If the root does not receive a response within this time period, the root assumes that it is the optimal root of the spanning tree.

At block 1225, a device receives the message. For example, intermediate zone player(s) between the root and the router receive the message and use, for example, an ethertype field to identify the special root path cost query (rtPathCostQry) frame. At block 1230, the intermediate device determines if it has an unexpired forwarding entry for the destination MAC address in its bridge table. If not, at block 1235, the message is dropped. If it does have a forwarding entry for the message destination, then, at block 1240, the device forwards the message. For example, the intermediate zone player forwards the frame as regular unicast frame following spanning tree rules. At block 1245, the device responds back to the root with a root path cost associated with that device. For example, if the zone player has registered to receive the frame (e.g., using an application process) and has at least one wired/wireless interface in a forwarding state, the zone player will unicast a response with the zone player's current "root path cost". However, if the intermediate zone player does not have a forwarding entry for root path cost query destination MAC address, the zone player will drop the rtPathCostQry frame.

At block 1250, the device receives process of blocks 1225-1245 is repeated in subsequent hops as the message from the root is sent to the router. In ideal case, when the existing root is the optimal one, none of the other zone players on the network will receive the rtPathCostQry frame. If any zone players(s) have received hops to the gateway frame, there is a room to optimize the spanning tree.

At block 1255, the root determines whether any responses have been received within the allotted time. If no responses have been received, then, at block 1260, the root designation remains unchanged. At block 1265, if the root has received any response from an intermediate device, then a new root is determined. The new root can be determined based on a comparison of the root path cost responses received from the intermediate zone players, for example.

At block 1270, the new root device is informed of its designation as root (e.g., exchanging the bridge priority). Other devices on the network may be informed as well. At block 1275, the root device determines whether a change in network topology has occurred. If so, then the process restarts at block 1205. If not, the device(s) wait for a change in topology to re-evaluate root selection. In certain embodiments instead of or in addition to re-evaluating root selection after a change in network topology, the root may be re-selected after a power cycle of the root bridge.

In certain embodiments, during a topology change, more than one bridge might decide that it is root of the spanning tree. To prevent initiation of root selection during this period, the current root zone player can be configured to wait for a period of time after reception of a last topology change notification. If there is no new topology change notification received during this period, the root device initiates a root reselection process.

In certain embodiments, propagation of a Topology Change Notification (TCN) in a spanning tree protocol is a slow process. Once a device decides that it needs to send a TCN, the device forwards the TCN to its designated bridge through its root port. The designated bridge sends back an acknowledgement (ACK) and has the responsibility to forward the TCN towards the root. After reception of the TCN frame, the root sets the topology change (TC) flag in its "Hello" frames. The TC is subsequently forwarded by other bridges in the network. Depending on the Hello interval and amount of hops the Hello frame needs to propagate, there might be substantial delay between the time a bridge sends a TCN frame towards a root and the time a bridge number of hops receives the notification. Thus, in certain embodiments, a TCN settle time can be determined as a combination of the following: 1) a time for the TCN to propagate from the bridge that generates the TCN to the root bridge (e.g., 1.5 ms); and 2) a time for the root's Hello to propagate to all bridges in the network (e.g., assuming seven (7) maximum hops). For example, a Hello interval times seven (7) hops plus one equals fifteen (15) seconds, assuming a Hello interval of two (2) seconds. In certain embodiments, to help ensure that the root as well as intermediate zone player(s) has a forwarding entry for the default router, the root can send an address resolution protocol (ARP) request for the default router's IP address before initiating the root reselection process.

While certain examples have been illustrated in the Figures, one or more of the interfaces, data structures, elements, processes and/or devices illustrated in the Figures can be combined, divided, re-arranged, omitted, eliminated and/or implemented in any way. Further, one or more of the example components can be implemented by hardware, software, firmware and/or any combination of hardware, software and/or firmware. Thus, for example, any of the example components disclosed herein can be implemented by one or more circuit(s), programmable processor(s), application specific integrated circuit(s) (ASIC(s)), programmable logic device(s) (PLD(s)) and/or field programmable logic device(s) (FPLD(s)), and so on.

When any apparatus claim of this patent is read to cover a purely software and/or firmware implementation, at least one of the example components is hereby expressly defined to include a computer readable storage medium such as a memory, Blu-ray, DVD, CD, and so on, storing the software and/or firmware. Further still, the example devices disclosed herein can include one or more elements, processes and/or devices in addition to, or instead of, those illustrated in the Figures, and/or can include more than one of any or all of the illustrated elements, processes and devices.

VIII. Conclusion

As discussed above, systems and methods are provided to offer wireless playback of audio in a household and/or other playback environment while reducing or avoiding perceptible lag in media content delivery. The embodiments described herein may be used to react to changing network topology to continue to provide efficient, low-latency media content delivery. The embodiments described herein may be further useful by systems in which low-latency delivery of media content over a wireless communication link is required or preferred.

Certain embodiments provide a method including transmitting, from a playback device designated as a current root device on a playback network, a query message to a router on the playback network, the playback network organized according to a spanning tree protocol. The example method includes evaluating, at the current root device, a response received from at least one intermediate device between the current root device and the router, the at least one intermediate device relaying the query message from the current root device to the router and transmitting a response back to the current root device indicating a root path cost associated with that intermediate device. The example method includes determining, at the current root device, based on the received root path cost response(s), an updated designation of a new root device for the playback network. The example method includes, if the new root device is different from the current root device, exchanging, via the current root device, bridge priority between the current root device and the new root device.

Certain embodiments provide a computer readable storage medium including instructions for execution by a processor, the instructions, when executed by the processor, to implement a method of spanning tree root re-selection in a playback network. The example method includes transmitting, from a playback device designated as a current root device on a playback network, a query message to a router on the playback network, the playback network organized according to a spanning tree protocol. The example method includes evaluating, at the current root device, a response received from at least one intermediate device between the current root device and the router, the at least one intermediate device relaying the query message from the current root device to the router and transmitting a response back to the current root device indicating a root path cost associated with that intermediate device. The example method includes determining, at the current root device, based on the received root path cost response(s), an updated designation of a new root device for the playback network. The example method includes, if the new root device is different from the current root device, exchanging, via the current root device, bridge priority between the current root device and the new root device.

Certain embodiments provide a media playback device including a communication interface to send and receive data via a network connection, the data including multimedia content for playback. The example media playback device includes a memory to store instructions and data including a designation of the media playback device as root for a local playback network. The example media playback device includes a processor to transmit a query message to a router on the local playback network, the local playback network organized according to a spanning tree protocol. The example processor is to evaluate a response received from at least one intermediate device between the root and the router, the at least one intermediate device to relay the query message from the root to the router and to transmit a response back to the root indicating a root path cost associated with that intermediate device. The example processor is to determine, based on the received root path cost response(s), an updated root designation for the local playback network. The example processor is to, if the updated root designation is different from the root, exchanging bridge priority between the media playback device and the intermediate device associated with the updated root designation.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A method comprising:
    transmitting, by a current root network device, a first unicast message to a network router;
    determining, by the current root network device, whether the first unicast message is received by one or more other intermediate network devices;
    if the current root network device determines that the first unicast message is not received by one or more other intermediate network devices, then sending a second unicast message to the network router; and
    if the current root network device determines that the first unicast message is received by one or more other intermediate network devices, then:
        identifying, by the current root network device, a particular network device of the one or more other intermediate network devices that received the first unicast message to serve as a new root network device; and
        sending, by the current root network device, a message to designate the identified particular network device as the new root network device.

2. The method of claim 1, wherein the current root network device determines that the first unicast message is not received by the one or more other intermediate network devices, the method further comprising:
    determining that the second unicast message is received by one or more other intermediate network devices;
    identifying, by the current root network device, a particular network device of the one or more other intermediate network devices that received the second unicast message to serve as a new root network device; and
    sending, by the current root network device, a message to designate the identified particular network device as the new root network device.

3. The method of claim 1, wherein sending the second unicast message to the network router comprises sending the second unicast message to the network router a predetermined amount of time after the first unicast message was sent.

4. The method of claim 1, further comprising:
    detecting a change in topology of a playback network, wherein transmitting the first unicast message to the network router comprises transmitting the first unicast message to the network router in response to detecting the change in topology of the playback network.

5. The method of claim 1, wherein transmitting the first unicast message to the network router comprises transmitting the first unicast message to the network router upon powering up the current root network device.

6. The method of claim 1, wherein identifying the particular network device of the one or more other intermediate network devices that received the first unicast message to serve as a new root network device comprises:
    determining that a first root path cost associated with one of the one or more other intermediate network devices is greater than a second root path cost associated with another of the one or more other intermediate network devices; and
    identifying, based on the determination that the first root path cost is greater than the second root path cost, the one of the one or more other intermediate network devices to be the particular network device.

7. The method of claim 1, wherein sending the message to designate the identified particular network device as the new root network device comprises sending, to the identified particular network device, the message to designate the identified particular network device as the new root network device.

8. A network device comprising:
    data storage for storing instructions that when executed by a processor cause the network device to perform functions comprising:
        transmitting, by the network device when the network device is a current root network device, a first unicast message to a network router;
        determining, by the current root network device, whether the unicast message is received by one or more other intermediate network devices;
        if the current root network device determines that the first unicast message is not received by one or more other intermediate network devices, then sending a second unicast message to the network router; and
        if the current root network device determines that the first unicast message is received by one or more other intermediate network devices, then:
            identifying, by the current root network device, a particular network device of the one or more other intermediate network devices that received the first unicast message to serve as a new root network device; and
            sending, by the current root network device, a message to designate the identified particular network device as the new root network device.

9. The current root network device of claim 8, wherein the current root network device determines that the first unicast message is not received by the one or more other intermediate network devices, the functions further comprising:
    determining that the second unicast message is received by one or more other intermediate network devices;
    identifying, by the current root network device, a particular network device of the one or more other intermediate network devices that received the second unicast message to serve as a new root network device; and
    sending, by the current root network device, a message to designate the identified particular network device as the new root network device.

10. The current root network device of claim 8, where sending the second unicast message to the network router comprises sending the second unicast message to the network router a predetermined amount of time after the first unicast message was sent.

11. The current root network device of claim 8, the functions further comprising:
    detecting a change in topology of a playback network, wherein transmitting the first unicast message to the network router comprises transmitting the first unicast message to the network router in response to detecting the change in topology of the playback network.

12. The current root network device of claim 8, wherein the one or more other intermediate network devices is on a communication path between the current root network device and the network router.

13. The current root network device of claim 8, wherein identifying the particular network device of the one or more other intermediate network devices that received the first unicast message to serve as a new root network device comprises:
   determining that a first root path cost associated with one of the one or more other intermediate network devices is greater than a second root path cost associated with another of the one or more other intermediate network devices; and
   identifying, based on the determination that the first root path cost is greater than the second root path cost, the one of the one or more other intermediate network devices to be the particular network device.

14. The current root network device of claim 8, wherein sending the message to designate the identified particular network device as the new root network device comprises sending, to the identified particular network device, the message to designate the identified particular network device as the new root network device.

15. A non-transitory computer-readable medium including a set of instructions for execution by a processor, the set of instructions, when executed, implement a network device to perform functions comprising:
   transmitting, by the network device when the network device is a current root network device, a first unicast message to a network router;
   determining, by the current root network device, whether the unicast message is received by one or more other intermediate network devices;
   if the current root network device determines that the first unicast message is not received by one or more other intermediate network devices, then sending a second unicast message to the network router; and
   if the current root network device determines that the first unicast message is received by one or more other intermediate network devices, then:
      identifying, by the current root network device, a particular network device of the one or more other intermediate network devices that received the first unicast message to serve as a new root network device; and
      sending, by the current root network device, a message to designate the identified particular network device as the new root network device.

16. The non-transitory computer-readable medium of claim 15, wherein the current root network device determines that the first unicast message is not received by the one or more other intermediate network devices, the functions further comprising:
   determining that the second unicast message is received by one or more other intermediate network devices;
   identifying, by the current root network device, a particular network device of the one or more other intermediate network devices that received the second unicast message to serve as a new root network device; and
   sending, by the current root network device, a message to designate the identified particular network device as the new root network device.

17. The non-transitory computer-readable medium of claim 15, where sending the second unicast message to the network router comprises sending the second unicast message to the network router a predetermined amount of time after the first unicast message was sent.

18. The non-transitory computer-readable medium of claim 15, the functions further comprising:
   detecting a change in topology of a playback network, wherein transmitting the first unicast message to the network router comprises transmitting the first unicast message to the network router in response to detecting the change in topology of the playback network.

19. The non-transitory computer-readable medium of claim 15, wherein the one or more other intermediate network devices is on a communication path between the current root network device and the network router.

20. The non-transitory computer-readable medium of claim 15, wherein sending the message to designate the identified particular network device as the new root network device comprises sending, to the identified particular network device, the message to designate the identified particular network device as the new root network device.

* * * * *